US007284232B1

(12) United States Patent
Bates et al.

(10) Patent No.: US 7,284,232 B1
(45) Date of Patent: *Oct. 16, 2007

(54) AUTOMATED GENERATION OF ALIASES BASED ON EMBEDDED ALIAS INFORMATION

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/570,871

(22) Filed: May 15, 2000

(51) Int. Cl.
G06F 9/44 (2006.01)
G06F 15/00 (2006.01)
(52) U.S. Cl. .................. 717/100; 715/513; 715/501.1; 717/106; 717/115
(58) Field of Classification Search .............. 709/200, 709/217, 219; 707/104.1, 512, 100, 4; 345/826, 345/156; 715/513, 501.1; 717/100–115
See application file for complete search history.

(56) References Cited

U.S. PATENT DOCUMENTS

| 5,862,325 | A |   | 1/1999 | Reed et al. ............. 395/200.31 |
| 5,909,207 | A | * | 6/1999 | Ho ............................. 345/156 |
| 5,918,237 | A | * | 6/1999 | Montalbano ................ 715/513 |
| 5,924,108 | A |   | 7/1999 | Fein et al. .................. 707/531 |
| 5,937,163 | A |   | 8/1999 | Lee et al. .............. 395/200.48 |
| 5,937,404 | A |   | 8/1999 | Csaszar et al. ................. 707/9 |
| 5,961,602 | A |   | 10/1999 | Thompson et al. ......... 709/229 |
| 5,963,964 | A |   | 10/1999 | Nielsen ...................... 707/501 |

(Continued)

FOREIGN PATENT DOCUMENTS

| JP | 11-195027 | | 7/1999 |
| JP | 2000-099436 | | 4/2000 |
| JP | 2000-105775 | | 4/2000 |
| JP | 2000099436 A | * | 4/2000 |
| JP | 2000-132565 | | 5/2000 |
| JP | 200132565 A | * | 5/2000 |

OTHER PUBLICATIONS

W. Friedman, "Getting Ready for Internet Explorer 5: Tips for Web Site Authors," http:/msdn.microsoft.com/library/default.asp? url=/library/en-us/dnie50/html.

(Continued)

Primary Examiner—Meng-Al T. An
Assistant Examiner—Insun Kang
(74) Attorney, Agent, or Firm—Wood, Herron & Evans, LLP

(57) ABSTRACT

An apparatus, program product and method incorporate embedded alias information into a document for use in automatically generating aliases (e.g., bookmarks, favorites, shortcuts, etc.) in a computer environment. The embedded alias information may incorporate both an identification of a predetermined storage location and an alias description to be associated therewith, such that, during generation of an alias, both the location and the description for the alias are obtained from the embedded alias information. The embedded alias information may also incorporate a condition associated with a predetermined storage location, in addition to or in lieu of an identification of the actual predetermined storage location, such that, during generation of an alias, the condition may be tested so that the alias will be generated only upon the condition being met. The embedded alias information may also incorporate an executable program to further customize or enhance the generation of aliases.

45 Claims, 4 Drawing Sheets

U.S. PATENT DOCUMENTS

| | | | |
|---|---|---|---|
| 5,978,818 A | 11/1999 | Lin | 707/501 |
| 5,983,190 A | 11/1999 | Trower, II et al. | 704/276 |
| 5,983,244 A | 11/1999 | Nation | 707/501 |
| 6,003,048 A | 12/1999 | Fallside | 707/513 |
| 6,009,441 A | 12/1999 | Mathieu et al. | 707/516 |
| 6,032,162 A | 2/2000 | Burke | 707/501 |
| 6,037,934 A | 3/2000 | Himmel et al. | 345/335 |
| 6,100,890 A * | 8/2000 | Bates et al. | 345/826 |
| 6,208,995 B1 * | 3/2001 | Himmel et al. | 707/104.1 |
| 6,334,145 B1 * | 12/2001 | Adams et al. | 709/217 |
| 6,393,462 B1 * | 5/2002 | Mullen-Schultz | 709/206 |
| 6,631,496 B1 * | 10/2003 | Li et al. | 715/501.1 |
| 6,810,395 B1 * | 10/2004 | Bharat | 707/4 |
| 6,848,075 B1 * | 1/2005 | Becker et al. | 715/501.1 |
| 2001/0011285 A1 * | 8/2001 | Kanno et al. | 707/512 |
| 2001/0011365 A1 * | 8/2001 | Helfman | 717/1 |
| 2004/0088381 A1 * | 5/2004 | Borman et al. | 709/219 |
| 2004/0236774 A1 * | 11/2004 | Baird et al. | 707/100 |

OTHER PUBLICATIONS

"Organize Your Web Research", *PC Computing*, Ziff-Davis (Feb. 1998), p. 140.

*Screen Shots of Microsoft Internet Explorer 3.0 Web Browser*, (asserted Copyright 1995-1996).

*Screen Shot of Microsoft Internet Explorer 3.0 Web Browser*, (printed 1998).

Guildford, Ed, *Netscape Communicator 6-in-1*, QUE, Macmillan Computer Publishing, (Jul. 11, 1997), pp. 29-32.

* cited by examiner

```
<ALIAS
    URL = [location identifier1], [location identifier2], . . .
    TITLE = [alias description1], [alias description2], . . .
    JAVASCRIPT = [javascript url]
    CONTAINER = [container identifier]
    CONDITION = [criterion]>
```

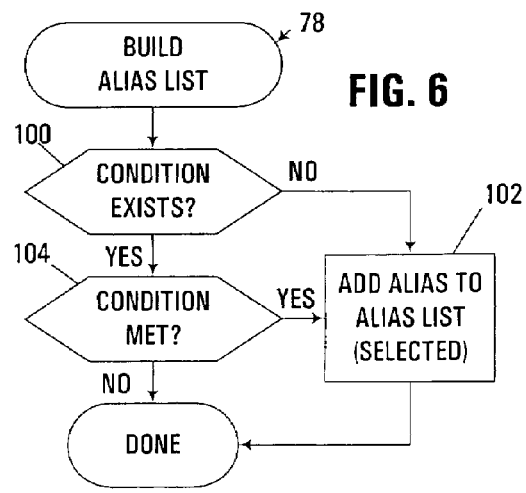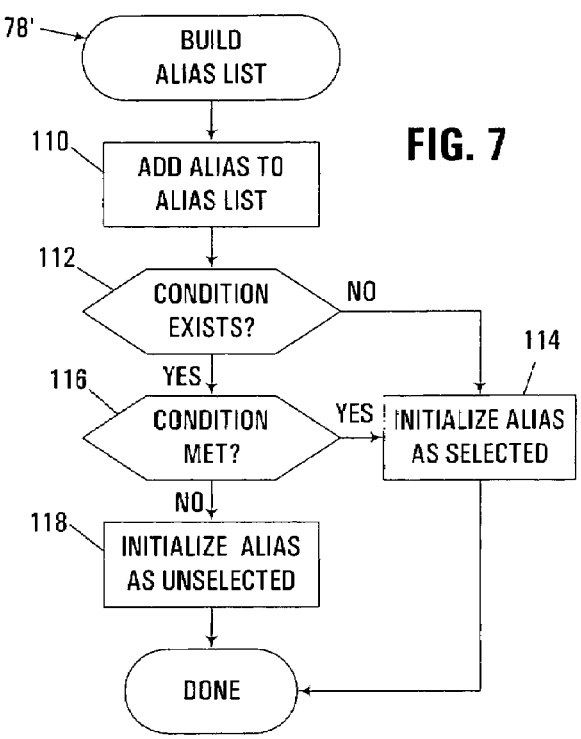
FIG. 6
FIG. 7
FIG. 8

AUTOMATED GENERATION OF ALIASES BASED ON EMBEDDED ALIAS INFORMATION

FIELD OF THE INVENTION

The invention is generally related to computers and computer software. More specifically, the invention is generally related to a manner of aliasing storage locations in a computer system, e.g., using bookmarks, favorites, shortcuts, and the like.

BACKGROUND OF THE INVENTION

Information is typically stored and accessed on a computer system using an address that identifies where in the computer system the information can be found. For public networks such as the Internet, an identifier known as a Uniform Resource Locator (URL) is used to identify the address of a particular document. A URL typically includes a protocol identifier coupled to a domain identifier and optionally a filename specifying where in the domain the document is stored. Moreover, a specific location in a document may also be included in a URL. Due to all of this information, however, a URL can be quite complex for some documents, which makes it difficult for a user to remember URL's of previously-viewed locations, not to mention to type the URL's in the computer even if they are remembered.

As a result, many web or hypertext browsers—the computer applications that are typically used to view documents stored on the Internet—employ aliasing to facilitate user access to previously-viewed documents. Aliases, which are often also referred to as bookmarks, favorites, or shortcuts, typically include a unique word or phrase that a user can access to recall a document stored at a predetermined storage location (e.g., as identified by a URL). Aliases are typically maintained in drop-down menus, dialog boxes, explorer bars, etc., and can be individually selected by a user to retrieve a particular document, thereby eliminating the need for a user to type in a document's URL to retrieve the document.

Conventional web browsers enable a user to create, or add, aliases to an alias list. Typically, in response to an "add" request for a particular document being viewed, an alias is created with a location identifier pointing to the URL for the current document, and with an alias description or identifier that is generated from the title for the document. Given that a significant portion of the information stored on the Internet is found in hypertext documents formatted using a standard language known as the Hypertext Markup Language (HTML), many browsers access an HTML tag known as a title tag to obtain the initial alias description for a document alias. A title tag, which has the format "<TITLE> . . . </TITLE>", is principally used by a web browser to provide a short title that is typically displayed in the title bar of a web browser when the document is being viewed.

After initial creation of an alias, a user is often permitted to manually edit or otherwise configure the alias description for an alias so that a custom identification of a document may be created by any user. Conventional browsers also permit aliases to be grouped together in folders to facilitate location of a particular alias in a list.

As many users "surf the net", they tend to create a large number of aliases along the way, often resulting in the creation of large and cumbersome alias lists. As the number of aliases in a list rises, it becomes more difficult to locate particular aliases, and can induce users to select the wrong alias by mistake. Given the increasing bottlenecks and delays that can be experienced while surfing the Internet, navigation to incorrect locations can be time consuming and frustrating for users. Thus, both the organization of aliases, and the descriptions or titles of such aliases are often critical to the efficient use of aliases.

To improve the utility of aliases, therefore, a significant need exists for additional functionality for automating the creation of useful aliases. Conventional web browsers, however, provide only limited functionality in this regard. Often, the aliases automatically generated by conventional web browsers are limited in usefulness, and require significant manual editing or configuration by users to improve their utility for individual users. As such, the degree of manual intervention in the alias creation process is often greater than would be preferred by many users, which can decrease user productivity and lead to user frustration.

For example, one limitation of conventional web browsers is that the automated creation of aliases is typically limited to aliases of currently viewed documents. Thus, despite the fact that a more relevant document may exist for a given area of interest, a user is typically limited to aliasing a document that is currently being viewed. Otherwise, to alias the more relevant document, the user is required to either manually create an alias from scratch, or manually navigate to the other document before creating the alias.

Another limitation of conventional web browsers is that no consideration is made of the specific interests or situations of individual users. Any user that requests a new alias is typically presented with the same alias description suggestion. Depending on the user, the suggestion may or may not be useful. Title information, if used in the creation of aliases, therefore must also be generic enough to accommodate a maximum number of users. Often genericizing title information to accommodate many users, however, can lessen the overall utility of the title information.

Yet another limitation of conventional web browsers stems from the use of title information in generating alias information. In particular, by creating aliases based upon the information stored in a title tag for a document, the quality of an automatically generated alias description or identifier is wholly dependent upon the quality of the title created by the author of the document. Since the primary purpose of the title is unrelated to aliasing, titles are often inadequate to uniquely identify documents, thereby nullifying the benefit of such automatically generated aliases in the first place. Tailoring a title for a document for use as an alias may also not be an optimal solution for an author, as the information that makes a useful alias may not make a useful title.

Therefore, while conventional aliasing techniques can provide some assistance to users when navigating with web browsers and the like, a significant need still exists for improved automated generation of aliases to maximize the utility of automatically generated aliases and minimize the need for manual editing or configuration of such aliases by individual users.

SUMMARY OF THE INVENTION

The invention addresses these and other problems associated with the prior art by providing an apparatus, program product and method in which embedded alias information is incorporated into a document for use in automatically generating aliases in a computer environment. By embedding alias information within a document, a web browser or other computer program that receives the alias information is capable of generating aliases with greater flexibility, relevancy, and customization than has been available from conventional alias generation technologies. Doing so maximizes the utility of generated aliases, and often minimizes or eliminates the amount of manual editing or configuration by users.

Consistent with one aspect of the invention, the embedded alias information incorporates both an identification of a predetermined storage location and an alias description to be associated therewith. As such, during generation of an alias, both the location and the description for the alias are obtained from the embedded alias information. Among other benefits, incorporation of this information into a document permits a document author greater control over the generation of an automated alias. By including the location identification in the document, an alias may be associated with a location other than that of the document, thereby permitting an author to suggest a more relevant document to bookmark than the current document, if so desired. Also, by including description information that is separate from the title information for the document, both the title and the alias description may be tailored by the author as he or she sees fit.

Consistent with another aspect of the invention, the embedded alias information incorporates a condition associated with a predetermined storage location and an alias description to be associated therewith. As such, during generation of an alias, the condition may be tested so that the alias will be generated only upon the condition being met. Such conditional automated generation of an alias, among other benefits, may permit an author to customize a generated alias for different users and/or different situations, thereby freeing the author from having to provide a single alias that attempts to cover all users and situations.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a flowchart illustrating the build alias list routine referenced in FIG. 5.

FIG. 7 is a flowchart illustrating an alternate build alias list routine to that of FIG. 6.

FIG. 8 is a block diagram of an exemplary add alias window displayed by the process embedded alias information routine of FIG. 5.

DETAILED DESCRIPTION

The embodiments described hereinafter may be used to enhance the ability of a user to create and maintain effective aliases for storage locations on a computer system. An alias, which is also often referred to as a bookmark, a favorite, or a shortcut, typically provides an alternate and more descriptive identification of a storage location. The storage location may be internal to a workstation or other single-user computer, e.g., a filename and/or path for a particular document or file stored thereon. In the alternative, the storage location may be external to a workstation, e.g., as stored on a network server, e.g., over a private LAN or WAN, or over a public network such as the Internet. As such, the storage location may be identified by an address in the form of a Uniform Resource Locator (URL), the format of which is well known in the art. However, it should be appreciated that the invention may also be used in aliasing other locations of information within or outside of a particular computer system.

The herein described embodiment also provides aliases for documents stored in HTML format, which is a predominant format used for Internet documents. However, it should be appreciated that the invention may also be utilized with other document and file formats as well.

Prior to discussing specific embodiments of the invention, a brief description of exemplary hardware and software environments for use therewith is provided.

Hardware and Software Environment

Figure 1:
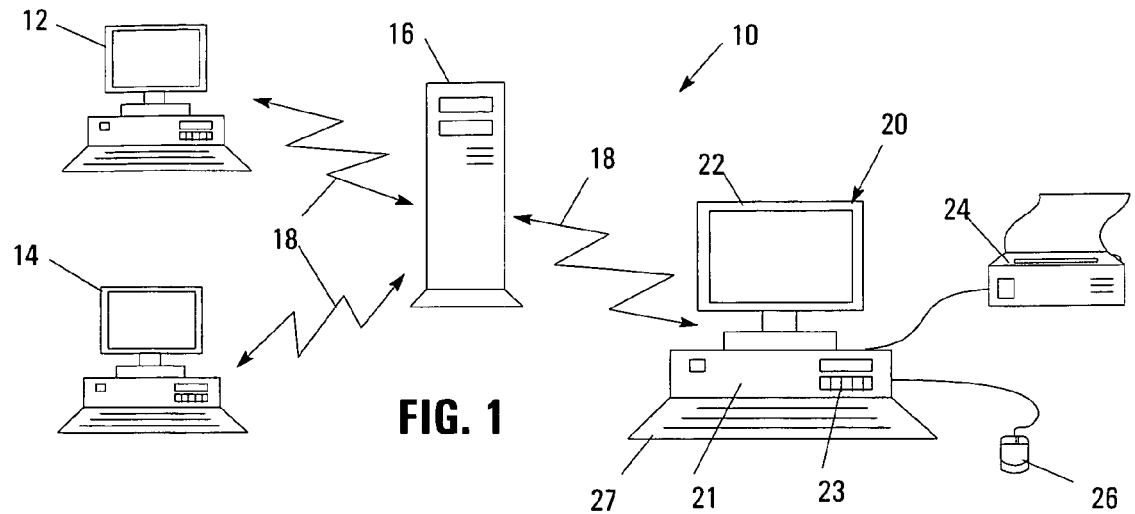
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
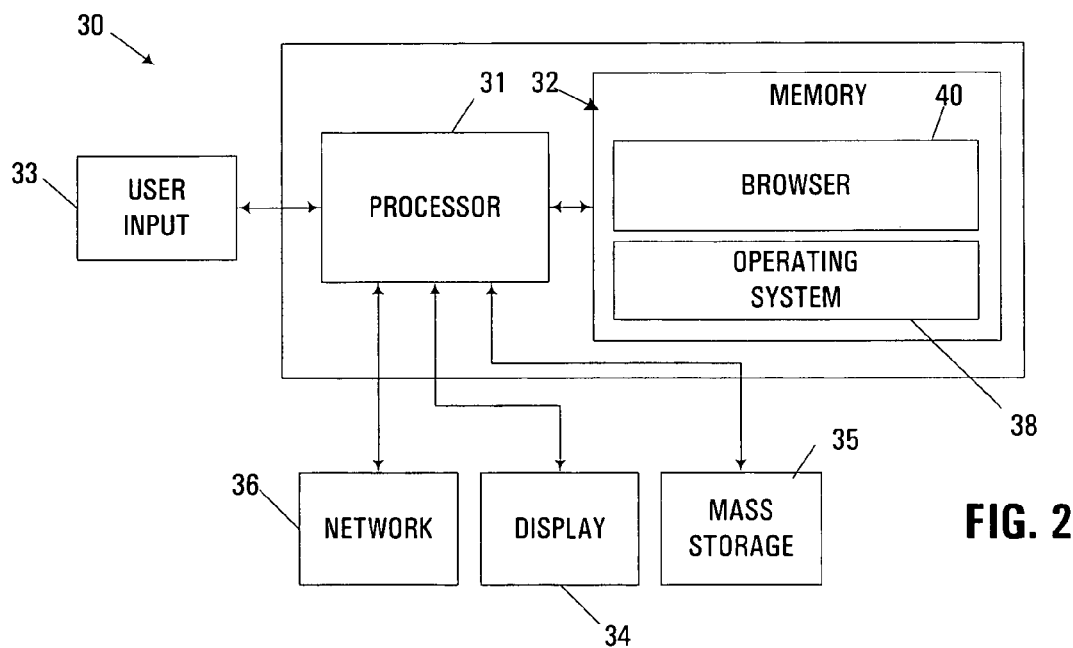
FIG. 2 is a block diagram of an exemplary hardware and software environment for a computer from the computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, a handheld computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others).

For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 38, and executes or otherwise relies upon various computer software applications, components, programs, objects, modules, data structures, etc. (e.g., browser 40, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM'ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Automated Alias Generation

An exemplary implementation of the invention in an Internet-based computing environment is discussed in greater detail hereinafter, specifically in the context of the automated generation of aliases to URL storage locations on the Internet, an intranet, an extranet, or even another form of public or private network, or local computer storage system. In the exemplary implementation, such functionality is implemented within an HTML-compatible web browser computer program. However, it will be appreciated that a browser consistent with the invention may also be capable of operating with other formats of storage location identifiers, as well as with other formats of viewable documents. Therefore, the invention is not limited to the particular implementation discussed herein.

Figures 3, 4:
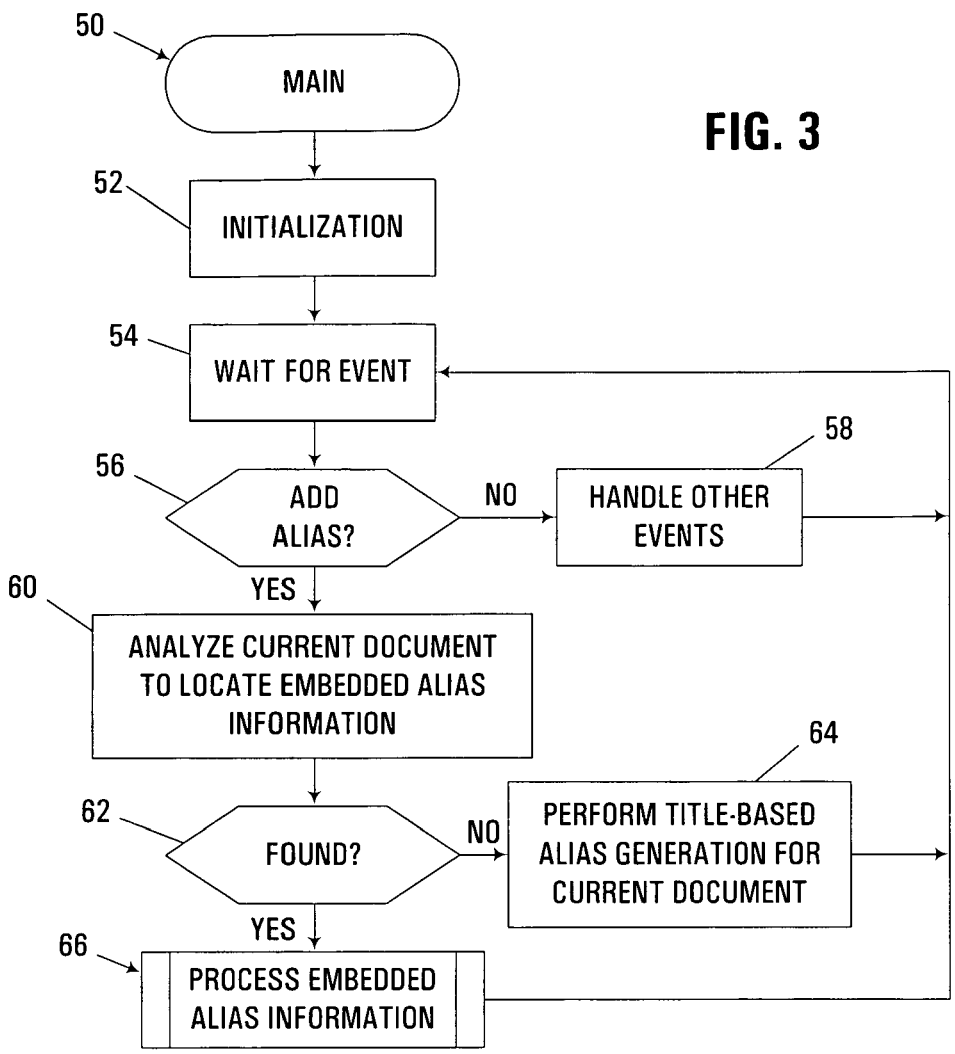
FIG. 3 is a flowchart illustrating a main routine executed by the browser of FIG. 2.
FIG. 4 is an exemplary HTML syntax for an alias tag consistent with the invention.

FIG. 3, in particular, illustrates a main routine 50 executed by browser computer program 40 of FIG. 2, which supports an "add alias" operation that is selectable by a user, e.g., during viewing of a document containing embedded alias information. In the illustrated invention, initiation of an add alias operation presents a user with a list of one or more proposed aliases that may be added in response to further user input. As such, a user might be presented with multiple alias options, and based upon that user's selection or de-selection of different aliases, different aliases could be added to the user's list of aliases. In other embodiments, however, no support may be provided for user selection or confirmation of aliases to be added in response to an add alias operation, whereby initiation of such an operation would result in any aliases provided in the embedded alias information for a current document to be automatically added, provided any optional conditions specified in the embedded alias information are met. In addition, in other embodiments, generation of aliases may be performed in connection with rendering of a document, whereby no separate add alias operation would need to be initiated by a user.

Upon startup of the browser, main routine 50 performs routine initialization in block 52, which is well known in the art. After initialization, an event-driven loop is initiated in block 54. In the event-driven loop, events directed to the web browser, e.g., user input, receipt of download data, etc., are passed to the browser via an event protocol as is well known in the art. Other programming models may be utilized in the alternative.

Receipt of an event passes control from block 54 to blocks 56 and 58 to decode and handle the event as appropriate. Block 54, for example, detects an add alias event, which may be generated, for example, in response to a request to add an alias via a menu bar selection, a tool-bar button, a control key sequence, a pop-up menu, etc. A number of additional events, which are not relevant to an understanding of the invention, are detected and handled in a conventional manner in block 58.

In response to an add alias event, block 56 passes control to block 60 to analyze the document currently being viewed to locate embedded alias information 4 stored therein. In the illustrated implementation, the embedded alias information is represented via one or more tags, similar to HTML-compatible formatting tags. As such, analysis of a document in block 60 includes scanning through the text information in the document to locate appropriate tags delimiting the embedded alias information.

A tag may be used to represent one alias, or in the alternative, multiple aliases may be represented by a single tag. Multiple tags may also be used to represent multiple aliases. In addition, alternate data structures to tags may be used to store embedded alias information consistent with the invention. For example, for non-text documents, various known non-textual data structures may be used.

FIG. 4 illustrates one exemplary format for an alias tag capable of being supported by a browser consistent with the invention. The alias tag includes both location identification information, (e.g., a URL), and alias description information representing the descriptive title to associate with an alias. Multiple aliases may be supported within an alias tag, e.g., by comma-delimiting multiple location identifiers and alias descriptions respectively within URL and TITLE fields of the tag.

The alias tag also includes an optional JAVASCRIPT field that provides the location of an executable program to be executed in association with an add alias event. As will become more apparent below, it may be desirable to execute a Javascript program in association with an add alias event to perform condition testing, alias description customization or other functionality to enhance the automated generation of aliases in the manner discussed herein. In the alternative, other executable program formats may be used, including both script or interpreted programs as well as compiled executable programs. Moreover, rather than providing a location identification for an executable program, the actual program code may be embedded in the alias information. In other embodiments, no executable program code may be supported, with the functionality for customizing an alias implemented directly within the browser computer program.

The alias tag also includes an optional container field that identifies a container, (e.g., a folder, directory, or other storage organizational construct) suitable for organizing aliases in a data structure (e.g., a tree data structure as is well known in the art). As will be discussed below, the optional container information may be utilized to direct generated aliases into a particular container in an alias data structure. Moreover, if a container does not exist at the time of alias creation, the container may be automatically created in association with creation of the alias.

The alias tag further includes a condition field that specifies a criterion utilized to condition the creation of one or more aliases represented by the tag. A condition may be applied to all aliases embedded in the alias tag, or may only be applied to individual aliases A number of different criteria may be utilized to condition the creation of a alias consistent with the invention. For example, the criterion may be based on local user information, whereby generation of an alias may be conditioned upon local user recommending different aliases based upon where the individual local user is located.

Local user criterion may also be based on user navigation, thereby permitting a customization of an alias based upon what documents a user has previously viewed. Thus, for example, users of different experience levels could have different types of documents recommended to them, with experience level detected based on what other documents users have previously viewed.

The local user criterion may also be based in certain applications on user purchase history, such that aliases may be customized based upon products that the user has previously purchased. This would permit, for example, users that have a substantial purchase history with a particular web site to have custom documents recommended to them based upon the types of products purchased by those users.

Local user criterion may also be based on local information such as the default language established for the user. Such a criterion may be used, for example, to select between different language versions of a given document.

Other information, including user demographic information such as race, ethnicity, sex, age, employment, educational background, etc., could also be used to modify the suggestion of aliases in a similar manner.

Other criterion may be utilized to condition an alias consistent with the invention. For example, a chronological criterion may be used, whereby the current time, date, etc. is compared with a criterion in the alias tag to determine what, if any, aliases should be automatically generated. Such functionality would permit, for example, different aliases to be suggested during different times of the day, different days of the week, different times of the year, etc., or based upon whether an expiration date has passed.

Other possible criterion include document position criterion, such that, for example, different aliases could be automatically generated in response to the position the user is viewing within a particular document. As an example, if different subjects are addressed in a single document, it may be assumed that a user is wishing to add an alias to a document based upon the particular subject being viewed at the time of the add alias operation. As such, different aliases that are associated with other documents that provide additional information about a particular subject may be suggested.

It will also be appreciated that an alias may include location identification information that specifies a particular location in a document, even the same document being viewed. This would permit, for example, an alias for a currently-viewed document to be embedded in that document with location information for that document so that the particular region being viewed at the time of the add alias operation would be viewed in response to activation of the alias at a future time.

The information utilized to a condition specified in an alias tag may be based upon local information such as "cookies" stored on a user's local computer. Such information may also be based, for example, on custom computer settings such as current browser configuration settings. Additional demographic information stored on a user's computer may also be utilized to test a condition. Furthermore, any manner of logically representing a condition, whether via program statements, boolean logic statements, or other manners of representing a testable condition, may be referenced in the condition field of a tag consistent with the invention. Other alternatives will be apparent to one of ordinary skill in the art having the benefit of the instant disclosure.

Returning to FIG. 3, once the current document is analyzed to locate embedded alias information, control passes from block 60 to block 62 to determine whether any such information has been found. If not, control passes to block 64 to perform conventional title-based alias generation for the current document. In particular, the title of the currently-viewed document is utilized in connection with the storage location of such document to present a dialog box to the user with a suggested alias to be generated. As per conventional browser technology, a user may be permitted to edit the alias description proposed in the dialog box, as well as to optionally specify a container in the alias data structure within which to store the newly-created alias.

Figure 5:
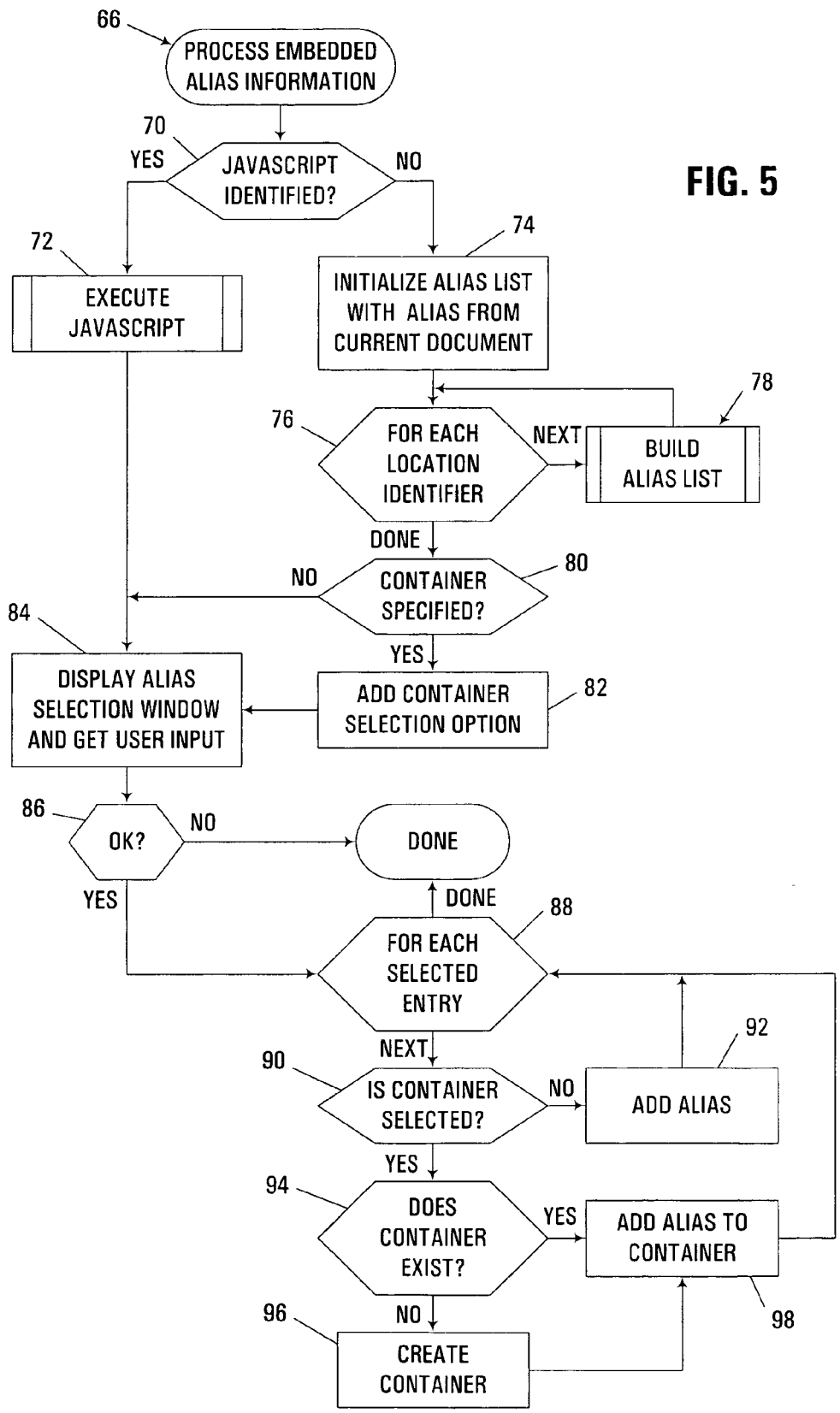
FIG. 5 is a flowchart illustrating the process embedded alias information routine referenced in FIG. 3.

Returning to block 62, if any embedded alias information is found, control passes to block 66 to call a process embedded alias information routine, which is illustrated in greater detail in FIG. 5.

Routine 66 begins in block 70 by determining whether a Javascript program is identified in the embedded alias information. In particular, the support of a Javascript reference in embedded alias information is utilized to provide functionality for testing conditions or otherwise custom-tailoring alias information in response to local user or other information. In the alternative, such functionality may be implemented directly within the browser code. As such, both options are illustrated in routine 66, although either option may be supported independent of the other.

If a Javascript program is identified in the embedded alias information, control passes to block 72 to execute the Javascript program. If not, however, control passes to block 74 to initialize an alias list with a single entry—that of a title-based alias for the current document, similar to conventional browser alias generation. In the alternative, block 74 may simply initialize the alias list with a null value, so that an alias for the current document is not suggested. The alias list is utilized to build a dialog box or window through which a user selects or de-selects listed aliases prior to their creation, such that a user may custom-tailor what, if any, aliases are generated in response to an add alias request.

After the alias list is initialized, block 76 initiates a FOR loop to process each location identifier provided in the embedded alias information. Routine 66 presupposes that only one embedded tag is provided in the current document. In other embodiments, however, multiple alias tags may be supported in a given document, whereby location information for a plurality of tags may need to be processed.

For each location identifier provided in the embedded alias information, control passes to block 78 to call a build alias list routine and thereby build a list of suggested aliases that a user is capable of selecting or de-selecting prior to the automated generation of aliases.

Once each location identifier has been processed in such a manner, control passes to block 80 to determine whether a container is specified in a container field for the embedded alias information. If so, control passes to block 82 to add a container selection option to an alias selection window that will be used to receive user input for controlling the automated generation of aliases. Control then passes to block 84 to display the alias selection window and receive user input. In addition to the container selection option, the list entries corresponding to the proposed aliases added in blocks 76 and 78 are displayed in the alias selection window concurrently with the container selection option.

In an event-driven graphical user interface environment, display of an alias selection window typically incorporates interaction with a user separate from routine 66 until the window has been "dismissed" by a user. As will be discussed in greater detail below, additional input, (e.g. an "OK" button and "cancel" button) may be used to dismiss the window and restart routine 66 at block 86.

Block 86 therefore determines upon return from interaction with the alias selection window whether the "OK" button was depressed to signify that automated generation of aliases should proceed using the currently-selected information entered in the selection window. If the dialog window was not dismissed via the "OK" button, block 86 terminates routine 66 without adding any additional aliases, as it assumes that the user has decided to terminate the add alias operation without adding any new aliases.

If the "OK" button was used to dismiss the window, control instead passes to block 88 to initiate a FOR loop to process each selected entry from the alias selection window. For each such entry, control passes to block 90 to determine whether the container selection option was enabled (i.e., whether a container was specified in the embedded information), and if so, whether such an option was selected via user input. If not, an alias is generated, or added to the existing alias data structure for the user, in block 92, typically incorporating the location identifier and alias description associated with the currently-processed entry. The new alias is typically stored in a default container for the alias data structure. In addition, it may be desirable to permit a user to manually input an alternate container or location if so desired, as well as to edit the alias description for the entry, within the selection window or via another window displayed to a user prior to generation of the alias. Upon completion of block 92, control returns to block 88 to process additional entries.

Returning to block 90, if the container option is selected, control passes to block 94 to determine whether the container exists. If not, control passes to block 96 to create the container, and then to block 98 to generate, or add the alias to the alias data structure in the newly created container. Control then returns to block 88 to process additional entries. Returning to block 94, if the container already exists, control passes directly to block 98 to generate and store the alias in the container, bypassing block 96. And returning to block 98, once each selected entry has been processed, routine 66 is complete.

To build an alias list from which entries are generated for display to a user in the alias selection window, a number of different algorithms may be utilized. For example, as shown in FIG. 6, one implementation of build-alias list routine 78 only adds aliases to the list when such aliases match a specified condition in the embedded information. Routine 78 begins in block 100 by first determining whether a condition exists in the embedded alias information. If not, control passes directly to block 102 to add the alias to the alias list (specifically, to add an entry including the location identifier and alias description for the alias as specified in the alias tag). In addition, the default selection status for the proposed alias may be set to "selected" if desired (discussed below). Routine 78 is then complete.

Returning to block 100, if a condition does exist, control passes to block 104 to determine whether the condition has been met. If so, control passes to block 102 to add the alias to the alias list. On the other hand, if the condition is not met, block 104 terminates routine 78 without adding the alias to the alias list. Thus, any alias that does not meet the specified condition is not displayed to a user as an optional alias capable of being automatically generated.

As shown in FIG. 7, an alternate build-alias list routine 78' may be used in lieu of routine 78 of FIG. 6 should it be desired to utilize the condition information in the embedded alias information to provide a default selected or un-selected status for each proposed alias, such that aliases that meet the condition are initially selected, while aliases that do not meet the condition are still presented to the user, but are defaulted to unselected states.

Routine 78' begins in block 110 by adding the current alias to the alias list. Block 112 then determines whether a condition exists in the embedded alias information. If not, control passes to block 114 to initialize the newly-added alias as "selected", and routine 78' is complete. Returning to block 112, if the condition does exist, control passes to block 116 to determine whether such a condition has been met. If so, control passes to block 114 to initialize the alias as "selected". On the other hand, if the condition has not been met, control passes to block 118 to initialize the alias as "un-selected". Upon completion of block 118, routine 78' is complete.

An exemplary alias selection window 130 capable of being generated by main routine 50 is illustrated in FIG. 8. FIG. 8 may be generated, for example, in response to processing of an exemplary hypertext document such as shown below in Table I:

TABLE I

EXAMPLE HTML DOCUMENT

| 1 | <HTML> |
| --- | --- |
| 2 | <HEAD> |
| 3 | <BASE HREF = "http://www.example.com/flowers.htm"> |
| 4 | <TITLE>Flowers of the Upper Midwest</TITLE> |
| 5 | <ALIAS |
| 6 | URL = "http://www.example.com/mnflowers.htm", "http://www.example.com/wiflowers.htm" |
| 7 | TITLE = "Minnesota Flowers", "Wisconsin Flowers" |
| 8 | CONTAINER = "Flower Sites" |
| 9 | CONDITION = "1:State = MN; 2:State = WI"> |
| 10 | </HEAD> |
| 11 | <BODY> |
|  | . . . Document Body . . . |
| 12 | </BODY> |
| 13 | </HTML> |

The program of Table I includes an HTML-type alias tag as outlined above in connection with FIG. 4, specifying two possible aliases, a suggested container and a condition to apply against each of the aliases to determine whether either or both aliases should be initially selected or un-selected in the alias selection window.

As shown above, the exemplary hypertext document includes at line 3 a location identifier for the document. In addition, a title tag is represented at line 4, such that a default title-based alias can be generated for the document, and suggested to the user as represented by entry 132 in FIG. 8. An exemplary alias tag is represented in lines 5-9 of the example document, with line 6 specifying the location identifiers for two separate aliases, and with line 7 providing an associated alias description for each location identifier. Through the execution of routine 50 as described above, two additional suggested alias entries 134 and 136 may be generated and displayed in window 130.

Each entry 132-136 includes a check box 138 through which a user either selects or de-selects an entry to specify whether the alias represented by the entry should be automatically generated. Alias description information 140 is displayed alongside each check box, followed by a location identifier (URL) 142. In addition, given the provision of a container field at line 8 of the example document, a container selection box 144 is provided through which a user selects whether or not to store any selected aliases in the specified container.

The initial setting for each check box 138 is typically determined by analyzing the condition represented at line 9 of the example document. As mentioned above, any of a number of possible condition syntaxes may be used to represent a testable condition. For example, line 9 associates with each alias (identified by index values "1" and "2") a test condition, in this case based upon the geographical location of the user. Assuming that such information may be obtained for the local user, the test condition initially selects the first alias if the user is located in the state of Minnesota, while the test condition initially selects the second alias if the user's geographical location is in the state of Wisconsin. For the purposes of illustration, FIG. 8 illustrates the resulting window displayed to a user located in the state of Minnesota, such that the check box for entry 134 is initially selected, while that for entry 136 is not.

Typically, the default alias for the current document (as shown in entry 132) is initially selected. In other embodiments, however, default alias may initially be unselected, or the ability to select or de-select the default alias may not be supported.

After a user selects and/or de-selects entries in window 130 to his or her satisfaction, the user selects OK button 146 to proceed with generation of the selected aliases. For the representation of FIG. 8, therefore, the default alias and an alias to a "Minnesota Flowers" document will be generated and stored in a "Flower Sites" container, with the container created if the container does not already exist.

Other modifications will be apparent to one of ordinary skill in the art. Therefore, the invention lies in the claims hereinafter appended.

What is claimed is:

1. A computer-implemented method of creating an alias for a predetermined storage location in a computer system, the method comprising:

analyzing a document to locate embedded alias information within the document that identifies a predetermined storage location and an alias description to be associated therewith; and generating an alias for the predetermined storage location based upon the embedded alias information, wherein the embedded alias information identifies a plurality of predetermined storage locations and a plurality of alias descriptions to associate therewith, wherein generating the alias further includes:

displaying the alias descriptions for each of the plurality of predetermined storage locations to a user;

receiving user input to generate aliases for selected predetermined storage locations from the plurality of predetermined storage locations; and generating aliases for each of the selected predetermined storage locations based upon the embedded alias information, wherein no alias is generated for at least one non-selected predetermined storage location from the plurality of predetermined storage locations.

2. The method of claim 1, further comprising displaying at least a portion of the document on a computer display, wherein analyzing the document and generating the alias are performed in response to user input while the document is displayed on the computer display.

3. The method of claim 2, wherein the document is formatted in Hypertext Markup Language (HTML), and wherein the embedded alias information is embedded within a tag in the document.

4. The method of claim 3, wherein the embedded alias information includes a Uniform Resource Locator (URL) for the predetermined storage location.

5. The method of claim 1, wherein the document is addressed at a storage location that is different from the predetermined storage location.

6. The method of claim 5, wherein generating the alias further includes generating a second alias for the storage location at which the document is addressed.

7. The method of claim 1, wherein the embedded alias information further identifies a second predetermined storage location and a second alias description to associate therewith, the method further comprising generating a second alias for the second predetermined storage location based upon the embedded alias information.

8. The method of claim 1, wherein generating the alias further includes:
(a) displaying alias information for the alias to a user prior to generating the alias; and
(b) receiving user input to generate the alias while the alias information is displayed.

9. The method of claim 1, wherein the embedded alias information further identifies a container within which to store the alias, wherein generating the alias includes storing the alias in the container.

10. The method of claim 9, wherein generating the alias further includes creating the container if the container does not exist.

11. A computer-implemented method of creating an alias for a predetermined storage location in a computer system, the method comprising:
analyzing a document to locate embedded alias information with the document that identifies a predetermined storage location and an alias description to be associated therewith, wherein the embedded alias information further identifies a container within which to store the alias; and
generating an alias for the predetermined storage location based upon the embedded alias information and storing the alias in the container, wherein generating the alias further includes:
displaying container information for the container to a user prior to storing the alias in the container; and
receiving user input to store the alias in the container while the container information is displayed.

12. The method of claim 1, wherein the embedded alias information further includes a condition associated with the predetermined storage location, the method further comprising testing the condition prior to generating the alias.

13. The method of claim 12, wherein generating the alias is performed only in response to the condition being met.

14. The method of claim 12, further comprising initially de-selecting the alias if the condition is not met, wherein generating the alias is performed only in response to user input to select the alias.

15. The method of claim 12, wherein the condition includes a local user criterion, and wherein testing the condition includes comparing the local user criterion with local user information.

16. The method of claim 15, wherein the local user criterion includes at least one of user location, user navigation history, user purchase history, user language, and user demographics.

17. The method of claim 12, wherein the condition includes a chronological criterion, and wherein testing the condition includes comparing the chronological criterion with current chronological information.

18. The method of claim 12, wherein the condition includes a document position criterion, and wherein testing the condition includes comparing the document position criterion with a current document position.

19. The method of claim 12, wherein testing the condition includes analyzing a cookie stored on a local computer.

20. The method of claim 12, wherein testing the condition includes analyzing current user settings stored on a local computer.

21. A computer-implemented method of creating an alias for a predetermined storage location in a computer system, the method comprising:
(a) analyzing a document to locate embedded alias information within the document that identifies a predetermined storage location and an alias description to be associated therewith; and
(b) generating an alias for the predetermined storage location based upon the embedded alias information, wherein generating the alias includes executing an executable program referenced in the embedded alias information, wherein executing the executable program includes testing a condition, and generating the alias only if the condition is met.

22. An apparatus, comprising:
a memory within which is stored at least a portion of a document including embedded alias information that identifies a predetermined storage location and an alias description to be associated therewith; and
a program configured to analyze the document to locate the embedded alias information, and to generate an alias for the predetermined storage location based upon the embedded alias information, wherein the embedded alias information identifies a plurality of predetermined storage locations and a plurality of alias descriptions to associate therewith, and wherein the program is further configured to:
display the alias descriptions for each of the plurality of predetermined storage locations to a user;
receive user input to generate aliases for selected predetermined storage locations from the plurality of predetermined storage locations; and
generate aliases for each of the selected predetermined storage locations based upon the embedded alias information, wherein no alias is generated for at least one non-selected predetermined storage location from the plurality of predetermined storage locations.

23. The apparatus of claim 22, wherein the document is addressed at a storage location that is different from the first predetermined storage location, and wherein the program is configured to generate a second alias for the storage location at which the document is addressed.

24. The apparatus of claim 22, wherein the embedded alias information further identifies a second predetermined storage location and a second alias description to associate therewith, and wherein the program is further configured to generate a second alias for the second predetermined storage location based upon the embedded alias information.

25. The apparatus of claim 22, wherein the embedded alias information further identifies a container within which to store the alias, wherein the program is further configured to store the alias in the container.

26. The apparatus of claim 22, wherein the embedded alias information further includes a condition associated with the predetermined storage location, and wherein the program is further configured to test the condition prior to generating the alias.

27. The apparatus of claim 22, wherein the program is configured to generate the alias by executing an executable program referenced in the embedded alias information.

28. A program product stored in a computer storage medium, comprising:
a program configured when executed by a computer to analyze a document to locate embedded alias information within the document that identifies a predetermined storage location and an alias description to be associated therewith, and to generate an alias for the predetermined storage location based upon the embedded alias information, wherein the embedded alias information identifies a plurality of predetermined storage locations and a plurality of alias descriptions to associate therewith, and wherein the program is further configured to:
display the alias descriptions for each of the plurality of predetermined storage locations to a user;
receive user input to generate aliases for selected predetermined storage locations from the plurality of predetermined storage locations; and
generate aliases for each of the selected predetermined storage locations based upon the embedded alias information, wherein no alias is generated for at least one non-selected predetermined storage location from the plurality of predetermined storage locations.

29. A computer-implemented method of creating an alias for a predetermined storage location in a computer system, the method comprising:
(a) analyzing a document to locate embedded alias information within the document that identifies a condition associated with a predetermined storage location and an alias description to be associated therewith, wherein the document is addressed at a storage location that is different from the predetermined storage location;
(b) testing the condition; and
(c) generating an alias for the predetermined storage location only if the condition is met.

30. The method of claim 29, wherein the condition includes a local user criterion, and wherein testing the condition includes comparing the local user criterion with local user information.

31. The method of claim 30, wherein the local user criterion includes at least one of user location, user navigation history, user purchase history, user language, and user demographics.

32. The method of claim 29, wherein the condition includes a chronological criterion, and wherein testing the condition includes comparing the chronological criterion with current chronological information.

33. The method of claim 29, wherein the condition includes a document position criterion, and wherein testing the condition includes comparing the document position criterion with a current document position.

34. The method of claim 29, wherein testing the condition includes analyzing cookie information stored on a local computer.

35. The method of claim 29, wherein testing the condition includes analyzing current user settings stored on a local computer.

36. The method of claim 29, wherein testing the condition includes executing an executable program referenced in the embedded alias information, and wherein the condition is incorporated into the executable program.

37. The method of claim 29, wherein generating the alias is performed only in response to the condition being met.

38. The method of claim 29, further comprising initially de-selecting the alias if the condition is not met, wherein generating the alias is performed only in response to user input to select the alias.

39. An apparatus, comprising:
(a) a memory within which is stored at least a portion of a document including embedded alias information that identifies a condition associated with a predetermined storage location and an alias description to be associated therewith, wherein the document is addressed at a storage location that is different from the predetermined storage location; and
(b) a program configured to analyze the document to locate the embedded alias information, to test the condition, and to generate an alias for the predetermined storage location only if the condition is met.

40. The apparatus of claim 39, wherein the condition includes a local user criterion, and wherein the program is configured to test the condition by comparing the local user criterion with local user information.

41. The apparatus of claim 40, wherein the local user criterion includes at least one of user location, user navigation history, user purchase history, user language, and user demographics.

42. The apparatus of claim 39, wherein the condition includes a chronological criterion, and wherein the program is configured to test the condition by comparing the chronological criterion with current chronological information.

43. The apparatus of claim 39, wherein the condition includes a document position criterion, and wherein the program is configured to test the condition by comparing the document position criterion with a current document position.

44. The apparatus of claim 39, wherein the program is configured to test the condition by executing an executable program referenced in the embedded alias information, and wherein the condition is incorporated into the executable program.

45. A program product stored in a computer storage medium, comprising:
a program configured when executed by a computer to analyze a document to locate embedded alias information within the document that identifies a condition associated with a predetermined storage location and an alias description to be associated therewith, to test the condition, and to generate an alias for the predetermined storage location only if the condition is met, wherein the document is addressed at a storage location that is different from the predetermined storage location.

* * * * *